US007156204B2

(12) United States Patent
Gross

(10) Patent No.: US 7,156,204 B2
(45) Date of Patent: Jan. 2, 2007

(54) PORTABLE LADDER BASE WORKSTATION

(76) Inventor: Gary R. Gross, 305 High Grove Rd., Summerville, SC (US) 29485

( * ) Notice: Subject to any disclaimer, the term of this patent is extended or adjusted under 35 U.S.C. 154(b) by 0 days.

(21) Appl. No.: 10/855,754

(22) Filed: May 26, 2004

(65) Prior Publication Data

US 2005/0263348 A1 Dec. 1, 2005

(51) Int. Cl.
*B62B 1/12* (2006.01)

(52) U.S. Cl. .......................................... 182/20; 280/30

(58) Field of Classification Search .................. 182/20, 182/21, 129; 280/30, 47.18, 47.19, 47.35
See application file for complete search history.

(56) References Cited

U.S. PATENT DOCUMENTS 1,842,573 A * 1/1932 Treek .......................... 83/762
2,121,982 A * 6/1938 Pugsley ...................... 206/305
3,210,091 A * 10/1965 Ng .......................... 280/47.35
3,897,080 A * 7/1975 Isom ....................... 280/47.19
D249,032 S 8/1978 Tarran
4,258,826 A 3/1981 Murray
4,494,626 A 1/1985 Ast
4,690,248 A * 9/1987 Killeen ....................... 182/118
4,848,782 A * 7/1989 Schmidt ................ 280/47.131
4,934,485 A 6/1990 Purkapile
D338,306 S * 8/1993 White et al. ................. D34/24
5,329,979 A * 7/1994 Miller et al. ................ 144/329
5,382,032 A 1/1995 Wilson
5,484,160 A * 1/1996 Ek ............................ 280/659
5,642,895 A 7/1997 Wunder
6,109,628 A * 8/2000 Scheper ................... 280/47.35
6,170,839 B1 1/2001 Kizewski
6,173,811 B1 1/2001 Tornabene et al.
6,328,330 B1 12/2001 Haaser
6,361,057 B1 * 3/2002 Carter ......................... 280/63
6,708,993 B1 * 3/2004 Feik ............................ 280/63
2001/0013707 A1 8/2001 Lindwall

* cited by examiner

*Primary Examiner*—Alvin Chin-Shue
(74) *Attorney, Agent, or Firm*—B. Craig Killough

(57) ABSTRACT

A portable workstation has an integrated container, hand truck, and easily removable ladder. Wheels or casters are provided to make the device easily portable. An integrated removable ladder is used to push and guide or steer the device. The combination yields a portable workstation.

12 Claims, 2 Drawing Sheets

PORTABLE LADDER BASE WORKSTATION

FIELD OF THE INVENTION

This invention relates to tools generally, and is more specifically directed to a portable workstation, with the workstation in the form of a hand truck having an integrated ladder and storage container.

BACKGROUND OF THE INVENTION

Persons working in building maintenance or construction commonly use ladders. These persons also need tools at the jobsite, and they frequently need a work surface that can be used on location at the jobsite. Carrying a toolbox, a ladder, and a work surface can mean multiple trips back and forth between the jobsite and a vehicle or other storage location. Further, the location of the jobsites may require transporting a ladder, toolbox and workstation up or down several flights of stairs.

A need exists for a portable device that facilitates the transportation of a ladder, tools, and other articles, such as parts, and which will minimize the number of trips that a worker must make to transport these articles. Further, there is a need for a portable device that will provide a base or work station once the required tools are transported to the jobsite.

SUMMARY OF THE INVENTION

A portable workstation has an integrated container, hand truck, and easily removable ladder. Wheels or casters are provided to make the device easily portable. An integrated removable ladder is used to push and guide or steer the device. The combination yields a portable workstation.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
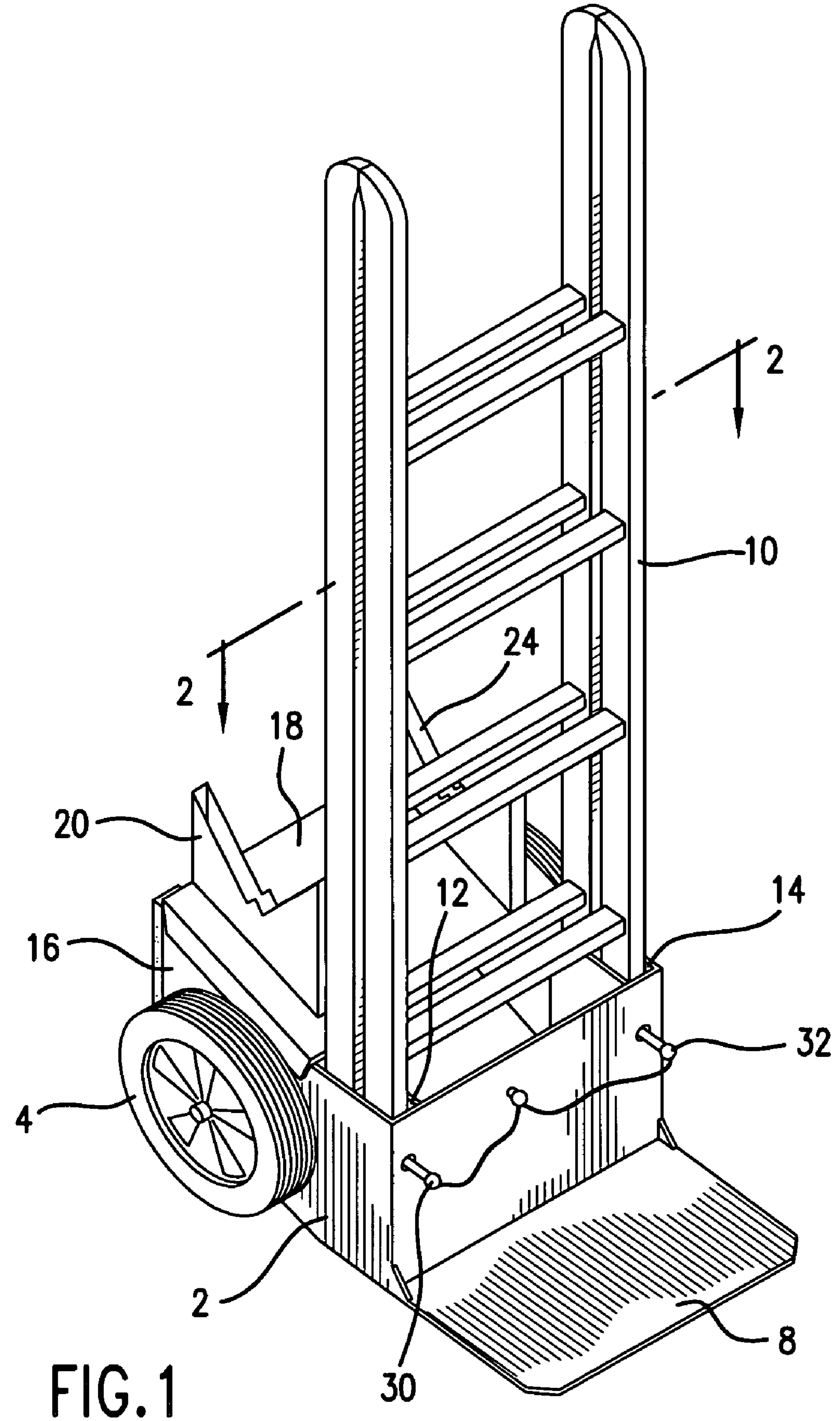
FIG. 1 is a perspective view of the device.

Turning now descriptively to the drawings, in which similar reference characters denote similar elements throughout the several views.

FIG. 1 shows the device as having a base 2 to which is mounted a first wheel 4 and a second wheel 6. A blade extends 8 from the base forward of the base and the wheels. A removable ladder 10 is inserted into a first receptacle 12 and a second receptacle 14 that are formed in the base. In the embodiment shown in the drawings, the base comprises a container box 16, which has a hinged lid 18 thereon. The container box lid has a work-piece retainer 20 that may be used to carry articles or position articles for various work operations.

Figure 2:
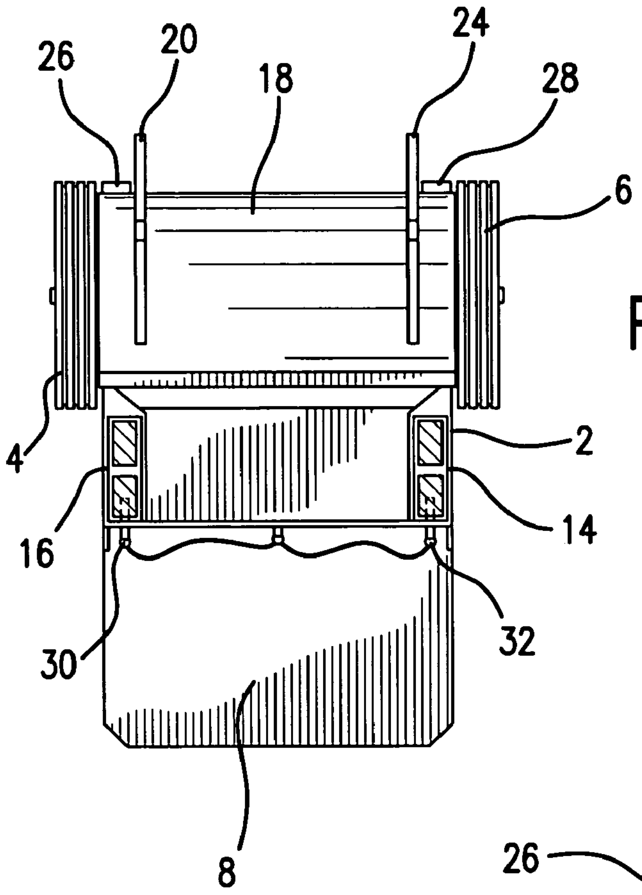
FIG. 2 is sectioned view of the device taken essentially along 2—2 of FIG. 1.
Figure 3:
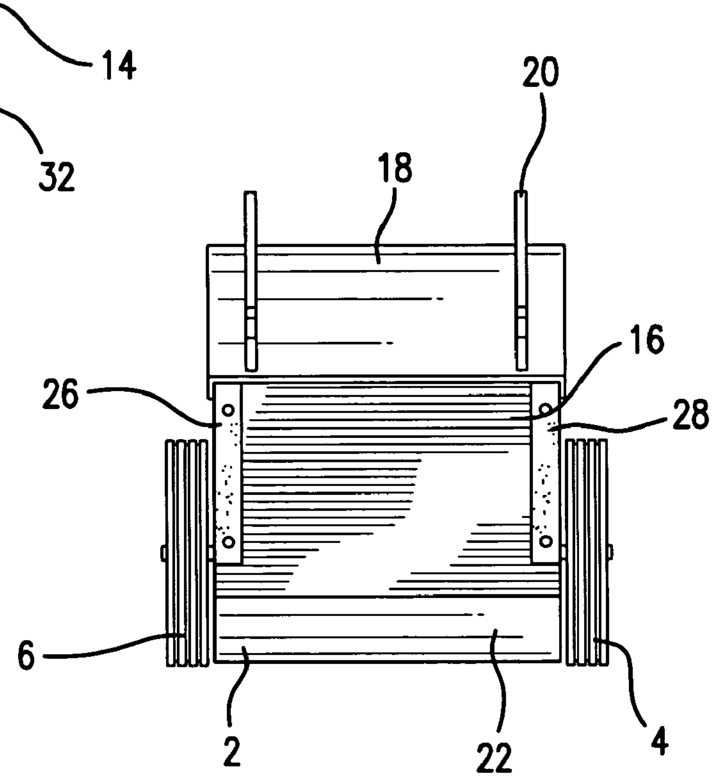
FIG. 3 is a side elevation of the device with the ladder removed.
Figure 4:
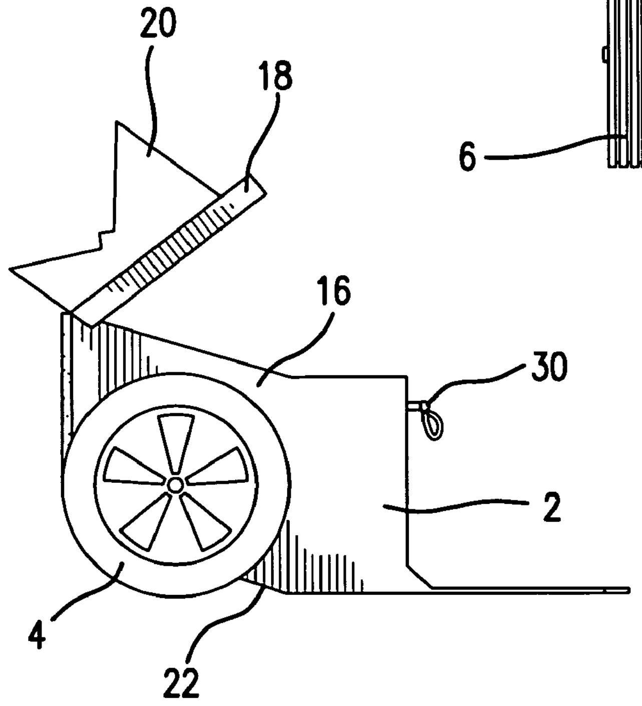
FIG. 4 is a side elevation of the device as shown in FIG. 3, but rotated 90°.

The container box is positioned between the first wheel 4 and the second wheel 6. The blade extends 8 from a lower front portion of the container box. As shown in FIG. 2 and FIG. 4, the container box extends forward of the wheels, but does not extend materially aft of the wheels. A bottom 22 of the container box slopes upwardly from a forward portion of the container box toward a rear container box. FIG. 4. The sloping bottom of the container box prevents the rear of the container box from striking the rolling surface when the device is used as a hand truck for transporting articles that are positioned on the blade, which is further facilitated by the rear of the box not extending materially aft of the wheels.

The container box permits objects, such as tools, building materials, parts and the like to placed within the container box and transported. The container box is preferred to have lid 16 thereon, and the lid is preferred to be hinged. A lock may be provided to secure the lid in position to secure the container box.

A work-piece retainer may extend upwardly from the lid. The work-piece retainer may take a form as desired, and may include a vise or a similar tooling. As shown, the work-piece retainer is a first generally V-shaped member 20 and a second generally V-shaped member 24. The V-shaped members may be used for carrying elongated articles, such as lumber, pipes or rods. The V-shaped members are also useful for retaining these elongated members while operations, such as cutting, are performed on the elongated members.

Resilient members 26, 28 maybe affixed to the rear of the container box. Resilient members may be nylon strips that are attached to each side of the rear of the container box.

A first generally vertical receptacle 12 and a second generally vertical receptacle 14 are positioned forward of the wheels. The receptacles are positioned generally parallel to each other, and are sufficiently elongated to retain the ladder therein. The receptacles are preferred to have four sides to surround the legs of the ladder, so that the ladder is retained within the receptacles without the necessity of attachment devices. As shown, a first pin 30 and a second pin 32 are provided for securing the ladder. The pins engage a void in the receptacles and a void in the ladder. However, the ladder is retained in the receptacles by the length of the receptacles and the four sides of the receptacles, such that the pins are not absolutely necessary. If a retainer is used for added safety, pins or some other quick-release method must be used for maximum convenience of the device. Threaded retaining means would require substantially more time to engage and disengage the ladder. The structure of the receptacles indicates that the additional security provided by threaded means is not necessary to the desired performance of the device.

The ladder as shown is hinged about an upper portion. The legs of the ladder are generally parallel to each other. The use of a ladder having generally parallel legs provides proper engagement with the vertical and elongated receptacles.

In use, tools, parts, and other articles are stored and transported within the container box. Larger articles may be transported using the device as a hand truck, by means of the blade that extends from the container box. The first leg of the ladder is inserted in the first receptacle, and a second leg of the ladder is inserted in the second receptacle. The ladder is then useful as a handle for pushing the portable workstation about, and vertical support for the article to be carried when using the portable workstation as a hand truck. The operator pulls back on the ladder, as if using a hand truck, to elevate the blade and any contents on the blade above the rolling surface. The upward sloping rear of the container box permits the blade to be elevated, without the rear of the container striking the floor. The device may then be transported by pushing against the ladder to move the device about. When the work location is reached, materials may be removed from the blade. The workstation may be positioned as desired, pushing the device about by means of the ladder. After the workstation is in position, the ladder may be removed and used as a ladder. Tools, parts and other articles may be removed from the container box, and the work-piece retainer may be used to hold articles.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A portable workstation, comprising:

a) a base having at least two wheels mounted thereto;

b) a blade extending outwardly from said base;

c) at least two vertical and generally parallel receptacles that extend upwardly from said base, wherein said at least two vertical and generally parallel receptacles are positioned forward of said at least two wheels;

d) a ladder having at least two generally parallel legs, wherein a first of said at least two generally parallel legs engages one of said at least two vertical and generally parallel receptacles and a second of said at least two generally parallel legs engages a second of said at least two vertical and generally parallel receptacles;

wherein said base comprises a container box that is positioned between said at least two wheels, and wherein most of a volume of said container box is positioned aft of said at least two vertical and generally parallel receptacles.

2. A portable workstation as described in claim 1, wherein sides of each of said at least two vertical and generally parallel receptacles are formed generally as a rectangle, and said at least two vertical and generally parallel receptacles are open at a top portion thereof.

3. A portable workstation as described in claim 1, wherein when said portable workstation is pushed by said ladder, said ladder is not retained within said at least two vertical and generally parallel receptacles by threaded means.

4. A portable workstation as described in claim 1, wherein said container box is positioned behind said blade when said blade is substantially parallel to a support surface for said wheels.

5. A portable workstation as described in claim 1, wherein said container box has a hinged lid thereon.

6. A portable workstation as described in claim 5, wherein said hinged lid has a work piece retainer extending upwardly there from.

7. A portable workstation as described in claim 6, wherein said work piece retainer is at least two generally V-shaped members.

8. A portable workstation as described in claim 1, wherein said blade extends outwardly from said container box.

9. A portable workstation as described in claim 1, wherein said blade extends outwardly from a bottom of said container box.

10. A portable workstation as described in claim 1, wherein a bottom of said base that is opposite said blade and aft of said at least two wheels slopes upwardly when said portable workstation is being transported.

11. A portable workstation as described in claim 1, wherein sides of each of said at least two vertical and generally parallel receptacles form an annular opening in a top portion thereof.

12. A portable workstation as described in claim 1, wherein each of said at least two vertical and generally parallel receptacles has at least four (4) sides that each join at least two other sides of said four sides, a bottom floor, and a top opening.

* * * * *